United States Patent [19]

Nishikawa et al.

[11] Patent Number: 4,905,024

[45] Date of Patent: Feb. 27, 1990

[54] PRODUCING ELECTRODE FOR INK DOT PRINTER

[75] Inventors: Hisashi Nishikawa, Suntoh; Mitsuharu Endo, Susono, both of Japan

[73] Assignee: Tokyo Electric Co., Ltd., Tokyo, Japan

[21] Appl. No.: 278,448

[22] Filed: Dec. 1, 1988

Related U.S. Application Data

[62] Division of Ser. No. 180,689, Apr. 8, 1988, Pat. No. 4,806,956.

[30] Foreign Application Priority Data

Mar. 20, 1985 [JP] Japan .................................. 60-56582
Jul. 5, 1985 [JP] Japan .................................. 60-204846

[51] Int. Cl.[4] .......................... G01D 15/16; B41J 3/04
[52] U.S. Cl. .......................................... 346/140 R
[58] Field of Search .......................................... 346/140

[56] References Cited

U.S. PATENT DOCUMENTS 3,666,966 5/1972 Buss .................................. 346/140
4,383,265 5/1983 Kohashi .................................. 346/140
4,806,956 2/1989 Mishikawa .................................. 346/140

*Primary Examiner*—Joseph W. Hartary
*Attorney, Agent, or Firm*—Oblon, Spivak, McClelland, Maier & Neustadt

[57] ABSTRACT

An ink dot printer wherein an ink supply member having both insulation property and ink-impregnation property is positioned in contact with conductive recording electrodes disposed opposite to an opposed electrode through a recording medium, and ink is fed from the ink supply member to fore ends of the recording electrodes, so that a printing operation can be performed without soiling the recording medium. Accordingly the entire structure can be simplified and the ink fed to the fore ends of the recording electrodes is effectively kept undried.

5 Claims, 8 Drawing Sheets

IMPROVED PRODUCING ELECTRODE FOR INK DOT PRINTER

This is a division, of application Ser. No. 180,689filed Apr. 8, 1988 now U.S. Pat. No. 4,806,956.

FIELD OF THE INVENTION AND RELATED ART STATEMENT

The present invention relates to a dot printer designed for drawing characters or figures by aggregating dots on a recording medium and, more particularly, to an ink dot printer for forming pictures with ink droplets sputtered selectively by electrostatic means.

There has been known heretofore a conventional ink dot printer of a type which forms a picture by ejecting ink droplets from nozzles. Although such type has some advantages of reduced printing noise and so forth, there also exists a fatal drawback that nozzle portions are prone to clog with ink.

In order to prevent such clogging with ink, some improvements have been contrived as disclosed in Japanese Patent Laid-open No. 56-170, wherein ink held in a slit is sputtered by electrostatic means to form a picture. In the above example, a multiplicity of electrodes are disposed opposite to an ink-holding slit through a recording paper, and a voltage is applied to the electrodes selectively to sputter the ink from the slit toward the energized electrodes. Such type, however, is still disadvantageous in the point that the ink to form dots is not releasable with ease from the slit. Another exemplary improvement accomplished to solve the above problem as disclosed in Patent Laid-open Nos. 56-4467 and 56-42664 has a structure of FIG. 27, wherein a multiplicity of recording electrodes 2 are arrayed in a slit 1 holding unshown ink therein, and a horizontally elongate electrode 4 is opposed through a recording paper 3 to the fore ends of the recording electrodes 2. A power supply 6 is connected via switching elements 5 between the opposed electrode 4 and the individual recording electrodes 2 for generating a potential difference sufficient to sputter the ink therebetween. At an inner position in the slit 1 is disposed an unshown pressure mechanism for swelling the ink surface in the form of a meniscus from an opening 7 of the slit 1.

When a printing operation is performed in the structure mentioned above, the switching elements 5 are selectively turned on in response to print signals. Then a potential difference is generated in each of the associated recording electrodes 2 so that the ink in the voltage-applied regions is sputtered toward the opposed electrode 4. Since the fore end portion of the ink held in the slit 1 is in the shape of meniscus at this moment by the pressure mechanism, the ink to be sputtered is readily released from the slit 1 to ensure stable printing.

In the above-described conventional art, however, there are the following problems. As the slit 1 and the recording paper 3 are moved relatively to each other, it is practically impossible to maintain the space constant therebetween. But in the structure mentioned, when the slit 1 and the recording paper 3 are brought to the mutual proximity as a result of some error in the space therebetween, the meniscus surface of the ink comes into contact with the recording paper 3 to eventually soil it.

Furthermore, since the ink is held in the flat slit 1, concentration of electric fields is not effected with facility by the application of high-voltage pulses to the selected recording electrodes 2. Therefore the direction of the sputtered ink is not fixed and, in the worst case, electric fields are concentrated at the corner of the slit 1 where none of the recording electrodes 2 is existent, so that the ink is sputtered from such corner portion.

In addition, a pressure mechanism is required for shaping the ink into a meniscus, hence rendering the structure of the entire apparatus complicated.

OBJECT AND SUMMARY OF THE INVENTION

It is a first object of the present invention to provide an ink dot printer free from a fault of soiling a recording paper during a printing operation.

A second object of the invention resides in providing an ink dot printer which is capable of concentrating electric fields in a satisfactory manner at the fore ends of recording electrodes.

A third object of the invention is to provide an ink dot printer of a simplified structure.

A fourth object of the invention resides in providing an ink dot printer where ink supplied to the fore ends of recording electrodes can be kept undried.

And a fifth object of the invention is to provide an ink dot printer in which individual blocks can be completely insulated t eliminate danger.

In the present invention, for the purpose of achieving the objects mentioned above, conductive recording electrodes confronting an opposed electrode are disposed in contact with an ink supply member having both insulation property and ink-impregnation property. And when the ink supply member is partially immersed in the ink, then the ink is absorbed throughout the supply member so as to be fed adequately to the fore ends of the recording electrodes. Since the ink is held in the supply member at this time, the recording medium is not soiled so conspicuously if it is brought into contact with the ink supply member. Furthermore, none of complicated mechanisms such as a pressure mechanism is required to eventually simplify the entire apparatus. In addition, the ink held in the supply member is substantially kept away from exposure to air and is thereby prevented from drying.

DETAILED DESCRIPTION OF PREFERRED EMBODIMENTS

Figure 1:
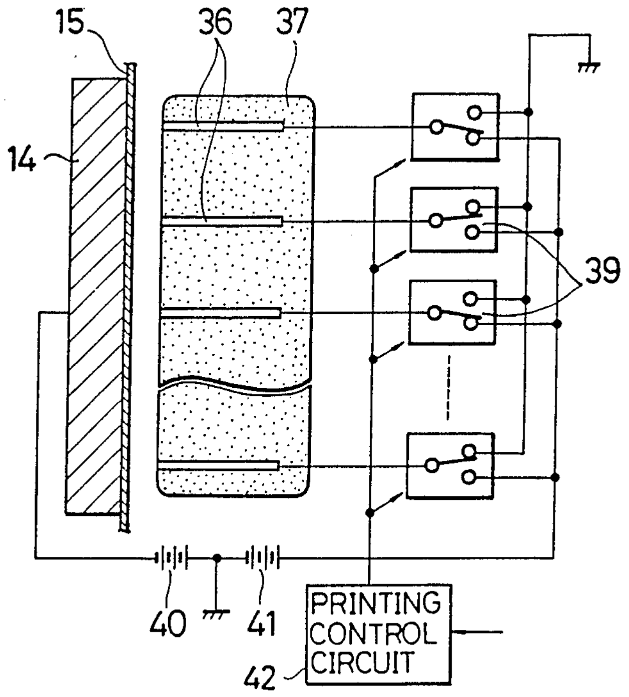
FIG. 1 is a side view schematically showing the relationship between a printer head and an opposed electrode in a first embodiment of the present invention.
Figure 2:
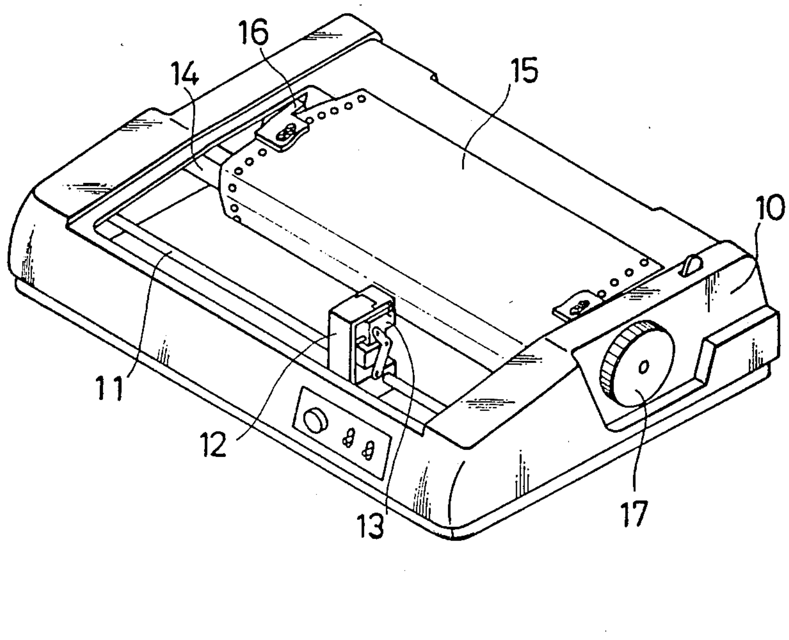
FIG. 2 is a general perspective view of the invention.

Hereinafter a first exemplary embodiment of the present invention will be described with reference to FIGS. 1 through 10. Two guide shafts 11 (in FIG. 2 is shown merely a single shaft) are disposed horizontally in a front region of a housing case 10. A carrier 12 is mounted on the guide shafts 11 in a manner to be reciprocable leftward and rightward, and a printer head 13 is supported in the carrier 12. At the center of the case 10, an opposed electrode 14 is positioned horizontally to confront the printer head 13. Tractors 16 are disposed behind the opposed electrode 14 for feeding a recording paper 15 which is guided between the opposed electrode 14 and the printer head 13. And an operating knob 17 projecting outward is connected to the tractors 16.

The carrier 12 is equipped with a guide support shaft 18 projecting toward the opposed electrode 14, and the printer head 13 is attached reciprocably to the guide support shaft 18. A tension spring 19 is interposed between the printer head 13 and the carrier 12 so as to pull the printer head 13 away from the opposed electrode 14. A cap 20 is attached to the top end of the carrier 12 in a manner to be rotatable around a pin 21 and is elastically urged by the tension spring 22 to cover the front of the printer head 13. Furthermore, a solenoid 23 is disposed under the carrier 12. The solenoid 23 is equipped with a moving core 24 engaged, at its end, with a slide slot 27 which is formed at an intermediate position of a <-shaped lever 26 held rotatably at a lower end thereof by a pivot 25. The lever 26 has another slide slot 28 at its upper end, and the printer head 13 is linked with the slot 28.

Figure 5:
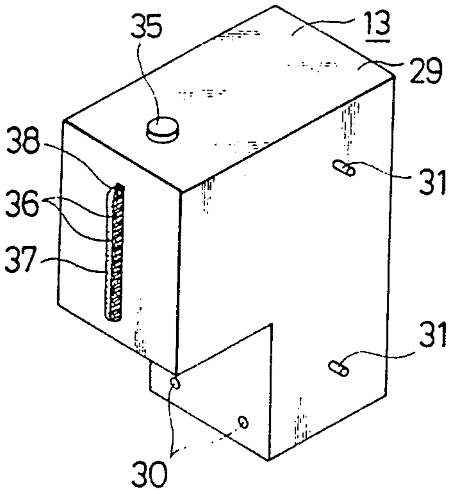
FIG. 5 is a perspective view of the printer head.
Figure 6:
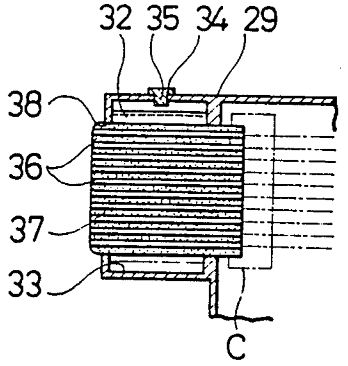
FIG. 6 is a vertical sectional side view of an ink tank.
Figure 7:
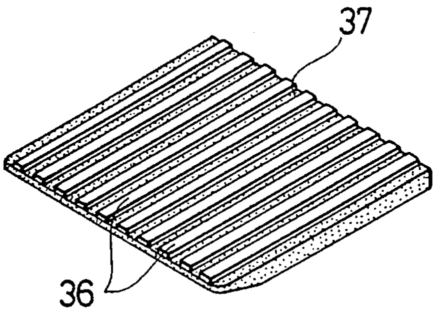
FIG. 7 is a perspective view of an ink supply member and recording electrodes.

Now the detail of the printer head 13 will be described below with reference to FIGS. 5 through 7. First, a slide hole 30 for permitting insertion of the guide support shaft 18 is formed in a lower portion of a box-shaped head case 29, and hooks 31 for anchoring the tension springs 19 and 22 are disposed on one side of the head case 29. An ink tank 33 for containing ink 32 is formed in an upper portion of the head case 29, and an ink supply port 34 is formed in the top of the head case 29 for enabling the ink tank 33 to communicate with the outside. The ink supply port 34 is covered with a lid 35. In the ink tank 33, a plate-shaped ink supply member 37 is disposed with a plurality of recording electrodes 36 arrayed fixedly thereon a equal intervals. The fore end of the ink supply member 37 is fitted into an electrode slit 38 formed through the front of the ink tank 33 and is thereby exposed to the outside. Each of the recording electrodes 36 consists of a plate-shaped conductive element, and the ink supply member 37 is composed of a material having both insulation property and ink-impregnation property. More specifically, the recording electrode 36 is composed of copper, titanium or nickel. Meanwhile the ink supply member 37 is composed of polyester fibers which have a porosity of 30 to 60% with a pore diameter of 20 to 40 microns and are bundled and bonded firmly with a binder in such a manner as to retain air permeability. In the structure of such polyester fibers, the pores are coupled to one another threedimensionally. The ink 32 used in this example has properties including a viscosity of 3 to 7 cp, a surface tension of 19 to 21 dyne/cm and a resistivity of $(1\text{-}6) \times 10^7$ ohm-cm.

The rear ends of the recording electrodes 36 are connected via connectors C to individual ends of high-voltage switches 39 respectively, whose other ends are connected to the opposed electrode 14 via two divided high-voltage power sources 40 and 41. The mid point of connection of such high-voltage power sources 40 and 41 is grounded. To each of the high-voltage switches 39 is connected a printing control circuit 42 which generates a control signal corresponding to a picture signal.

Figure 3:
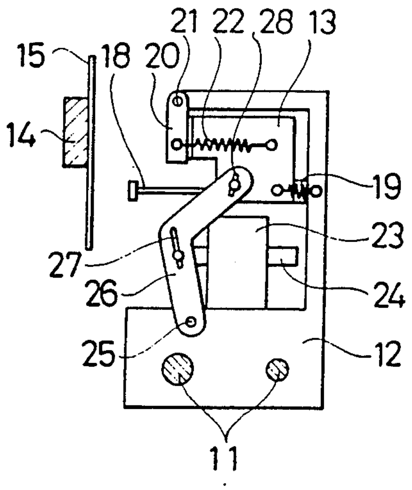
FIG. 3 is a side view of a carrier.
Figure 4:
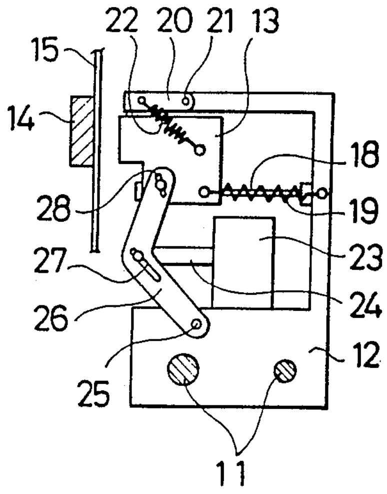
FIG. 4 is a side view of the carrier in a printing operation.

In the structure mentioned above, the solenoid 23 is energized prior to starting a printing operation. Then the movable core 24 is actuated to move forward, thereby displacing the printer head 13 to the proximity of the opposed electrode 14. At this moment the cap 20 is pushed and turned by the printer head 13, whose fore end is thereby opened to be ready for printing. With regard to such positional change of the printer head 13, FIG. 3 shows an initial position and FIG. 4 a printing ready position. Meanwhile, upon completion of the printing operation, first the solenoid 23 is deenergized. Then the printer head 13 is returned to its former position by the tension spring 19, and the cap 20 is pulled backward by the tension spring 22 to cover the fore end of the printer head 13. Thus the ink 32 can be kept undried with certainty during non-use of the printer.

Since the ink supply member 37 is mostly impregnated with the ink 32 contained in the tank 33, the ink 32 is absorbed to spread throughout the ink supply member 37. Accordingly the ink 32 is fed via the ink supply member 37 to the fore ends of the recording electrodes 36. In this stage the ink 32 fed to the fore ends of the recording electrodes 36 is held in the ink supply member 37, so that it is prevented from dripping. Therefore an adequate amount of the ink 32 can be fed to the fore end of each recording electrode 36. When a print signal is applied in a state where the printer head 13 is set at its printing ready position, the ink 32 at the fore end of the recording electrode 32 is sputtered in a sufficient amount. The printing signal is applied selectively from the printing control circuit 42 to the high-voltage switch 39. Then a potential difference is generated between the energized recording electrode 36 and the opposed electrode 14 by the high-voltage power sources 40 and 41, so that the ink 32 at the fore end of the recording electrode 36 is subjected to an electrostatic force and is thereby sputtered toward the opposed electrode 14. The ink 32 thus sputtered is in the shape of small droplets to form a dot when deposited on the recording paper 15. A multiplicity of such dots are aggregated selectively to print a character or figure on the recording paper 15.

Since the printer head 13 and the recording paper 15 are moved relatively to each other during a printing operation, the fore end of the printer head 13 or the ink supply member 37 projecting from the electrode slit 38 may come into contact with the recording paper 15. Even in such a case, however, the ink 32 in the relevant portion of contact is held within the ink supply member 37 and never causes conspicuous soil on the recording paper 15. Consequently it becomes possible to prevent a trouble of soiling the recording paper 15 much to eventually ensure a satisfactory printing operation.

Feeding the ink 32 to the fore ends of the recording electrodes 36 can be executed merely by immersing the ink supply member 37 in the ink 32, and no particular mechanism is required at all. Accordingly the printer head 13 can be produced in a remarkably simple structure to eventually realize a low-cost apparatus of high reliability with elimination of mechanical wear and fatigue.

Furthermore, the ink 32 is substantially kept away from touch with air as it is held within the ink supply member 37, whereby the ink 32 fed to the fore ends of the recording electrodes 36 is effectively prevented from drying in combination with another merit that the printer head 13 is covered with the cap 20 during nonuse of the printer.

In addition, there exists no necessity of employing any particular ink such as magnetic type, hence reducing the running cost with an advantage that a desired color is obtainable easily to facilitate color printing.

Figure 8:
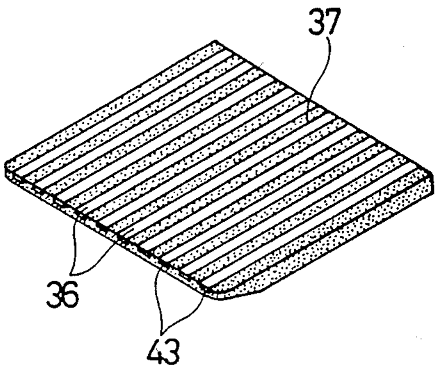
FIG. 8 is a perspective view of an exemplary modification of FIG. 7.
Figure 9:
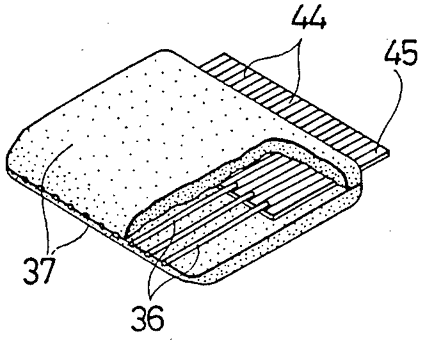
FIG. 9 is a perspective view of another exemplary modification.
Figure 10:
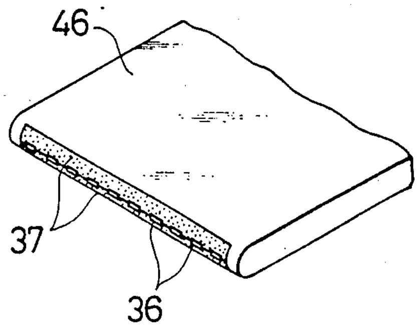
FIG. 10 is a perspective view of a further exemplary modification.

FIGS. 8 through 10 show some exemplary modifications of recording electrodes 36 and an ink supply member 37. In the example of FIG. 8, grooves 43 for fitting flat plate-shaped recording electrodes 36 therein are formed in the ink supply member 37, and the individual recording electrodes 36 are fitted and anchored respectively in the grooves 43. In this example, the surface of the ink supply member 37 supporting the recording electrodes 36 is shaped into a smooth plane to permit complete contact between the ink supply member 37 and the electrode slit 38 in the printer head 13. In the modification of FIG. 9, needle-shaped recording electrodes 36 are anchored in connection with a plurality of leads 44 formed on a thin-film PC board 45, and the recording electrodes 36 are sandwiched between two ink supply members 37. In assembling such a structure, the recording electrodes 36 may be inserted into a single ink supply member 37 as well. In the next example of FIG. 10, recording electrodes 36 are interposed between two ink supply members 37 which are covered with a holding case 46, wherein merely the fore ends of the recording electrodes 36 and the peripheries thereof are exposed to the outside. It becomes possible in this modification to increase the amount of the ink 32 fed to the fore ends of the recording electrodes 36.

Figure 11:
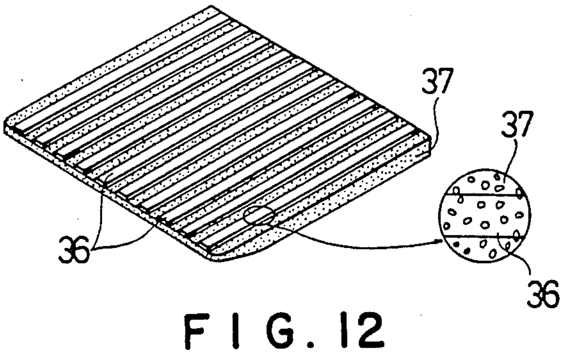
FIG. 11 is a perspective view showing an ink supply member and recording electrodes in a second embodiment of the invention.

Now a second preferred embodiment of the present invention will be described below with reference to FIG. 11, wherein components identical or corresponding to those used in the foregoing first embodiment are denoted by like reference numerals, and a repeated explanation is omitted here. In the second embodiment, recording electrodes 36 are formed on an ink supply member 37 by thin film technique. Accordingly a higher degree of freedom is achievable with respect to the shape of the recording electrodes 36 and also in designing the connector C or connection between high-voltage switches 39 and the recording electrodes 36. And pores in the ink supply member 37 are never crushed at the time of forming the recording electrodes 36 because the film thickness of each recording electrode 36 can be reduced to less than 0.5 microns. Thus the ink 32 is permitted to flow smoothly to the individual pores and is thereby fed effectively to the fore end of each recording electrode 36. Although the film thickness of the recording electrode 36 is less than 0.5 microns, it is sufficient for practical use since substantially no current flows in the recording electrodes 36 to eventually bring about no disadvantage such as generation of heat.

Figure 12:
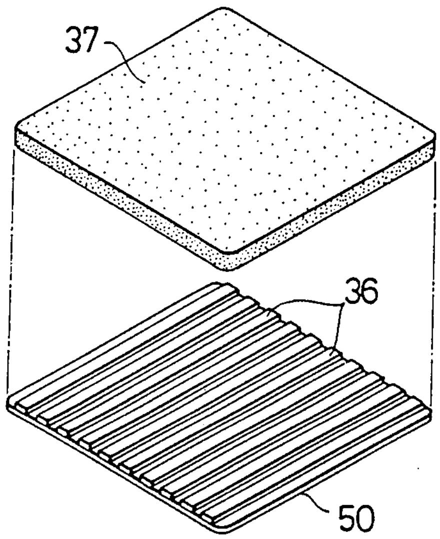
FIG. 12 is a perspective view of an insulator, recording electrodes and an ink supply member in a third embodiment of the invention.

A third preferred embodiment of the present invention will be described below with reference to FIG. 12, wherein components identical or corresponding to those used in the first embodiment are denoted by like reference numerals, and a repeated explanation is omitted here. In the third embodiment, recording electrodes 36 are formed on an insulator plate 50, and an ink supply member 37 is disposed in contact with the recording electrodes 36. In such a structure where the ink supply member 37 is retained merely in contact with the recording electrodes 36, pores in the ink supply member 37 are not deformed at all to consequently ensure effective feed of the ink 32 to the fore ends of the recording electrodes 36. Each of the electrodes 36 may be either shaped into a plate or formed by thin film technique.

Figure 13:
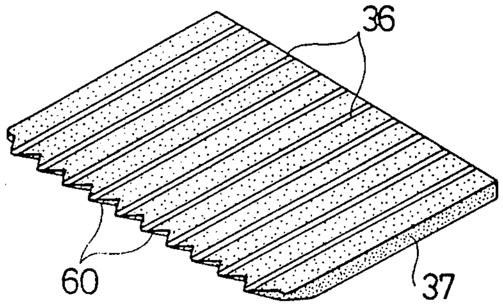
FIG. 13 is a perspective view of an ink supply member and recording electrodes in a fourth embodiment of the invention.
Figure 14:
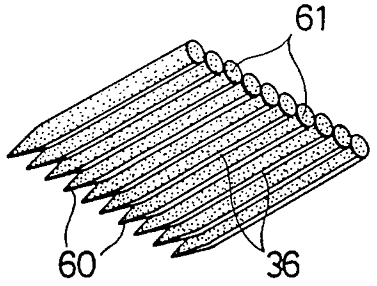
FIG. 14 is a perspective view of an exemplary modification of FIG. 13.
Figure 15:
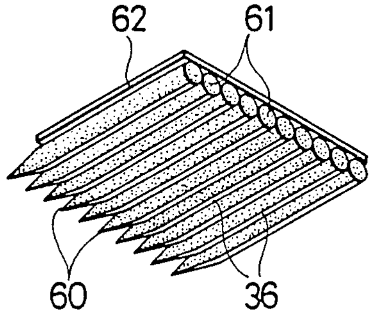
FIG. 15 is a perspective view of another exemplary modification of FIG. 13.

Now a fourth preferred embodiment of the present invention will be described below with reference to FIGS. 13 through 15, wherein components identical or corresponding to those used in the first embodiment are denoted by like reference numerals, and a repeated explanation is omitted here. In this example, portions of an ink supply member 37 contiguous with the fore ends of recording electrodes 36 protrude to form projections 60. In such a structure, electric fields can easily be concentrated on the projections 60 to cause accurate sputter of the ink 32 from the fore ends of the recording electrodes 36, hence ensuring a stable printing state. FIGS. 14 and 15 show exemplary modifications. First in the example of FIG. 14, a plurality of penpoint-like ink supply members 61 are coupled to one another, and recording electrodes 36 are formed on such ink supply members 61 by thin film technique, whereby the tapered tip of each ink supply member 61 is shaped into a projection 60. As regards the method of production, the ink supply members 61 may be bonded or welded to one another after forming the recording electrodes 36, and such steps may be carried out in the reverse order as well. As for the process of forming the recording electrodes 36, either etching or masking may be adopted. In another modification of FIG. 15, its structure is the same as the example shown in FIG. 14 with the exception that ink supply members 61 are anchored firmly on a base 62.

Figure 16:
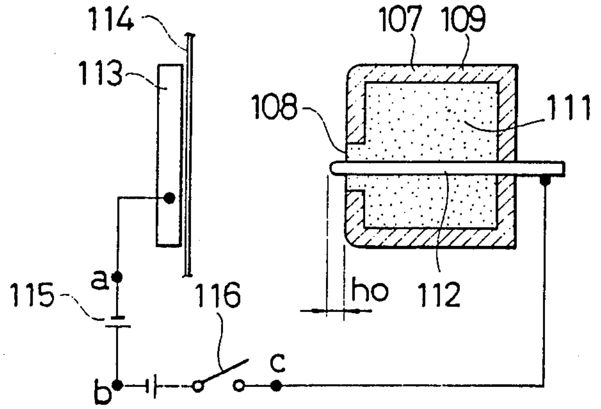
FIG. 16 is a vertical sectional side view of a fifth embodiment of the invention.
Figure 17:
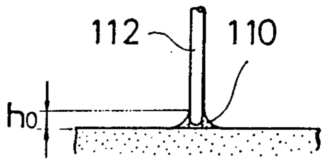
FIG. 17 is a vertical sectional side view illustrating a wetting height.
Figure 18:
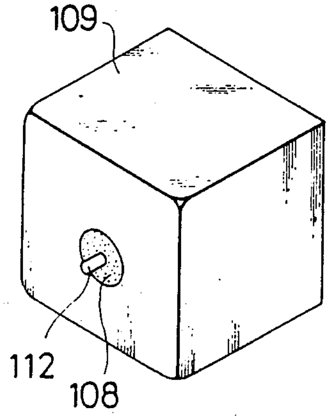
FIG. 18 is a perspective view of a printer head.

A fifth embodiment of the present invention will now be described with reference to FIGS. 16 and 18. First, a printer head 107 comprises a case 109 having an opening 108 in its front portion, an ink supply member 111 impregnated with ink 110 contained in the case 109, and a conductive recording electrode 112 extending therethrough to project from the opening 108. The fore end of the recording electrode 112 is shaped to be arcuate and projects from the surface of the case 109 by a dimension $h_0$ which corresponds to a wetting height of the ink 110. The wetting height $h_0$ means the rise of the ink 110 induced due to the hydrophilic property of the electrode surface when the recording electrode 112 is in contact with the surface of the ink 110 as shown in FIG. 17.

A plate-shaped opposed electrode 113 is positioned opposite to the printer head 107, and a recording paper 114 is joined to one surface of the opposed electrode 113 confronting the printer head 107. And between the opposed electrode 113 and the recording electrode 112, there are connected a power source 115 for causing a potential difference sufficient to sputter the ink 110, and also a switch 116 serving as a print signal circuit to generate such potential difference in accordance with a print signal. In the electric wiring mentioned above, three points a, b and c are set as shown in FIG. 16 for the convenience of explanation. And suppose now that point a corresponding to the opposed electrode 113 is grounded.

In such arrangement, the ink 110 having reached the fore end of the recording electrode 112 rises to the wetting height $h_0$. And the switch 116 is turned on or off in accordance with a print signal received in such a state. When the switch 116 is turned on, a high voltage is applied between the opposed electrode 113 and the recording electrode 112 to sputter the ink 110 from the fore end of the recording electrode 112 toward the opposed electrode 113. At this time the printer head 107 is reciprocated horizontally while the recording paper 114 is displaced vertically with on-off control of the switch 116, so that the dots formed with the ink 110 are positionally changed, and a character or figure is drawn with an aggregation of such dots.

Since the recording electrode 112 projects from the ink supply member 111, it functions similarly to an ordinary pen even when the recording paper 114 comes into contact with the printer head 107, hence avoiding a trouble of inducing conspicuous soil of the recording paper 114.

Furthermore, due to projection of the recording electrode 112 from the opening 108 by a length corresponding to the wetting height $h_0$, an electric field can be concentrated on the fore end of the recording electrode 112 to stabilize the sputter position of the ink 110, thereby eliminating formation of any unnecessary picture element. In particular, the distance between the recording paper 114 and the recording electrode 112 can be increased to reduce the probability of causing contact of the recording paper 114 with the recording electrode 112, whereby enhanced facility is attainable in handling the printer.

Although the fore end of the recording electrode 112 is shaped to be arcuate in the above embodiment, it may be conical or pyramidal as well.

Figure 19:
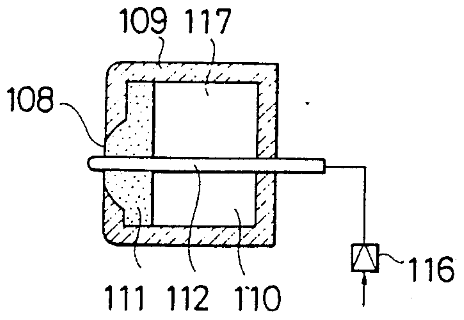
FIG. 19 is a vertical sectional side view of a sixth embodiment of the invention.

FIG. 19 shows a sixth embodiment of the present invention, wherein components identical or corresponding to those used in the fifth embodiment are denoted by like reference numerals, and a repeated explanation is omitted here. (This applies also to the next and following embodiments.) In this example, an ink chamber 117 is formed in a case 109 so as to increase the holdable amount of ink 110 therein for prolonging the continuous printing time.

Figure 20:
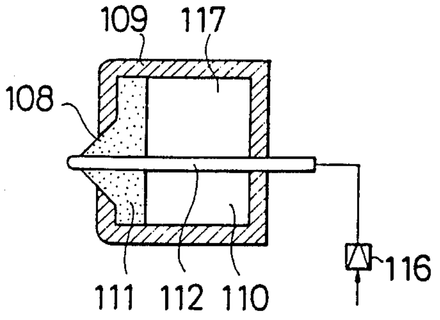
FIG. 20 is a vertical sectional side view of a seventh embodiment of the invention.

FIG. 20 shows a seventh embodiment of the present invention, wherein an ink supply member 111 partially projects from an opening 108 so that ink 110 can be fed to the fore end of a recording electrode 112 further smoothly.

Figure 21:
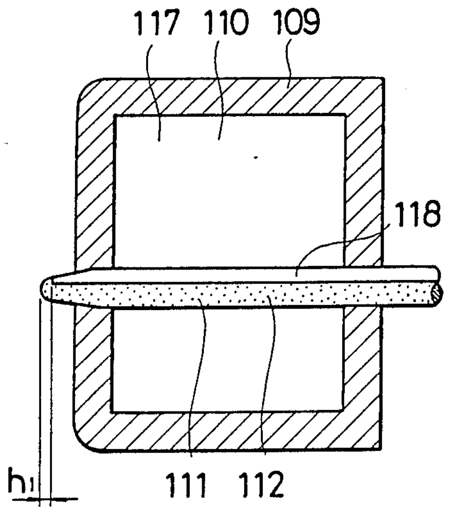
FIG. 21 is a vertical sectional side view of an eighth embodiment of the invention.
Figure 22:
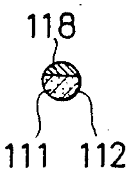
FIGS. 22 and 23 are vertical sectional front views of recording electrodes.
Figure 23:
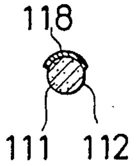

In an eighth embodiment of the invention shown in FIGS. 21 through 23, the entire internal space of a case 109 is used as an ink chamber 117, and a recording electrode 112 is composed of an ink-impregnable element 111 and a conductive element 118. The conductive element 118 partially constitutes the recording electrode 112 in a cross-sectional view and, at the fore end thereof, the ink-impregnable element 111 projects beyond the conductive element 118 by a dimension $h_1$ which is 0.1 mm or so. Therefore the ink 110 can be fed thoroughly to the fore end of the recording electrode 112, and satisfactory refillability is achievable to maintain sufficient supply of the ink 110 even in a fast printing operation.

Figure 24:
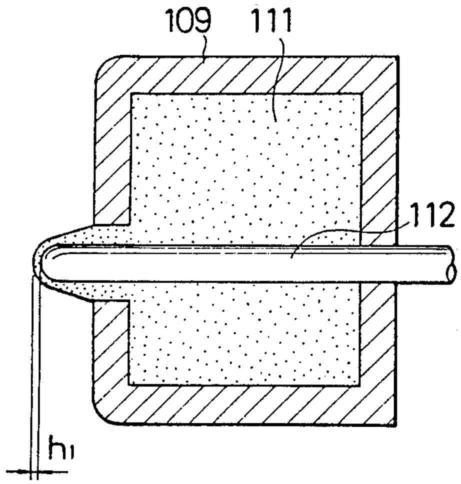
FIG. 24 is a vertical sectional side view of a ninth embodiment of the invention.

A ninth embodiment of the present invention will be described below with reference to FIG. 24, wherein a case 109 is filled with an ink supply member 111 which projects from an opening 108 in a manner to form a protuberance, and the fore end of a recording electrode 112 is inserted into such protuberance without being exposed to the outside. And a portion of the ink supply member 111 positioned at the fore end of the recording electrode 112 is so shaped as to have a thickness $h_1$.

Figure 25:
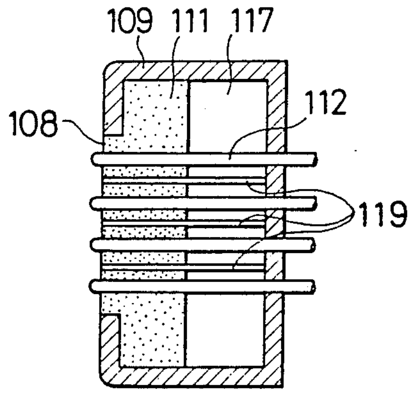
FIG. 25 is a vertical sectional side view of a tenth embodiment of the invention.

In a tenth embodiment of the present invention shown in FIG. 25, an opening 108 is formed into an elongate slit, and a plurality of recording electrodes 112 are disposed longitudinally along the opening 108 with insulator walls 119 interposed between the recording electrodes 112. Such arrangement is effective for preventing generation of arcs between the recording electrodes 112, and printing can be performed with application of high-voltage pulses individually thereto. Consequently it becomes possible to increase the number of recording electrodes 112 to execute a fast printing operation.

Figure 26:
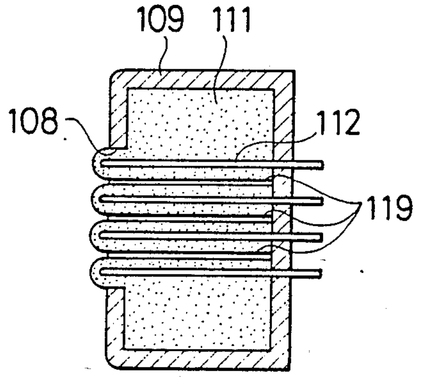
FIG. 26 is a vertical sectional side view of an eleventh embodiment of the invention.
Figure 27:
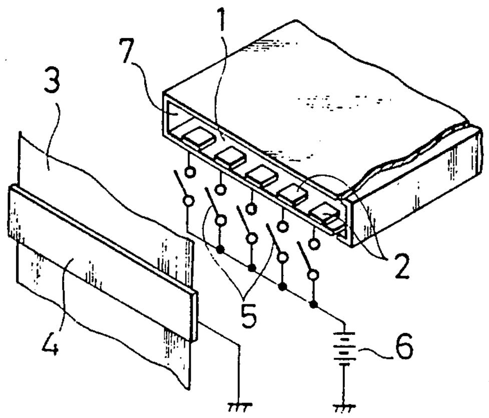
FIG. 27 is a perspective view of a conventional printer.

An eleventh embodiment of the present invention will now be described with reference to FIG. 26, wherein an ink supply member 111 is similar in shape to the aforementioned ninth embodiment, and protuberances are arrayed serially in an elongate slit similar to the opening 108 in the tenth embodiment.

In the aforesaid fifth through eleventh embodiments, point a is grounded so as to prevent arcing between the opposed electrode 113 and the recording electrode 112. Electrons are readily emitted if the dot-like recording electrodes 112 are poled negative. However, arcing hardly occurs in the arrangement where the opposed electrode 113 is poled negative as in the embodiments. Furthermore, complete safety can be maintained despite exposure of the opposed electrode 113.

Contrary to the above, point c may be grounded as well in implementing the invention. Although there exists a disadvantage that arcing is prone to occur in such a case, the potential of the printer head 107 is rendered lower to eventually facilitate manufacture of the apparatus.

In case point b is grounded, mutually reverse voltages are applied to the opposed electrode 113 and the recording electrode 112, so that the absolute voltage values become low to bring about remarkable effects in view of both safety and insulation for the apparatus.

We claim:

1. An ink dot printer wherein a recording electrode fed with ink at the fore end thereof is disposed opposite to an opposed electrode through a recording medium, and a picture is drawn with the ink sputtered from the fore end of said recording electrode toward the recording medium by generating a potential difference between said opposed electrode and said recording electrode, said ink dot printer characterized in that said recording electrode is composed of a conductive material formed on an ink supply member by thin-film techniques, wherein said ink supply member has both an insulation property and an ink-impregnation property, and a potential difference is generated between said opposed electrode and said recording electrode in such a manner that the voltage of said recording electrode become higher.

2. The ink dot printer as defined in claim 1, wherein said opposed electrode is grounded.

3. The ink dot printer as defined in claim 1, wherein said recording electrode is grounded.

4. The ink dot printer as defined in claim 1, wherein either said opposed electrode or said recording electrode is poled positive while the other is poled negative, and an intermediate point therebetween is grounded.

5. An ink dot printer wherein a recording electrode fed with ink at the fore end thereof is disposed opposite to an opposed electrode through a recording medium, and a picture is drawn with the ink sputtered from the fore end of said recording electrode toward the recording medium by generating a potential difference between said opposed electrode and said recording electrode, said ink dot printer characterized in that a plurality of conductive recording electrodes are disposed in contact with an ink supply member having both insulation property and ink-impregnation property, and said recording electrodes are insulated from one another by means of insulator walls.

* * * * *

UNITED STATES PATENT AND TRADEMARK OFFICE

CERTIFICATE OF CORRECTION

PATENT NO. : 4,905,024

DATED : FEBRUARY 27, 1990

INVENTOR(S) : NISHIKAWA, HISASHI

It is certified that error appears in the above-identified patent and that said Letters Patent is hereby corrected as shown below:

On the title page and Col.1,lines 1-5 should read

RECORDING ELECTRODE FOR INK DOT PRINTER

Signed and Sealed this

Twenty-fourth Day of November, 1992

*Attest:*

DOUGLAS B. COMER

*Attesting Officer*

*Acting Commissioner of Patents and Trademarks*